(12) United States Patent
Hsu et al.

(10) Patent No.: US 7,780,333 B2
(45) Date of Patent: Aug. 24, 2010

(54) OPTICAL PLATE WITH OPTICAL SHEET FIXING MEANS AND BACKLIGHT MODULE USING THE SAME

(75) Inventors: Tung-Ming Hsu, Taipei Hsien (TW); Shao-Han Chang, Taipei Hsien (TW); Fen Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 180 days.

(21) Appl. No.: 12/106,337

(22) Filed: Apr. 21, 2008

(65) Prior Publication Data

US 2009/0161345 A1 Jun. 25, 2009

(30) Foreign Application Priority Data

Dec. 21, 2007 (CN) .......................... 2007 1 0203336

(51) Int. Cl.
*F21V 7/04* (2006.01)
*G02F 1/13357* (2006.01)

(52) U.S. Cl. ................ 362/633; 362/634; 362/97.1; 362/311.01; 362/311.14; 349/58

(58) Field of Classification Search ................. 362/606, 362/633, 634, 97.1, 97.2, 97.3, 97.4, 311.01, 362/311.06, 311.14, 311.15, 326, 330, 339; 359/599; 349/58, 64
See application file for complete search history.

(56) References Cited

U.S. PATENT DOCUMENTS

| | | | | |
|---|---|---|---|---|
| 1,887,288 A | * | 11/1932 | Clausen ........................ 108/23 |
| 5,453,855 A | * | 9/1995 | Nakamura et al. ............ 349/58 |
| 6,016,175 A | * | 1/2000 | Kim ............................... 349/58 |
| 6,055,029 A | * | 4/2000 | Kurihara et al. ............... 349/65 |
| 6,068,381 A | * | 5/2000 | Ayres ......................... 362/633 |
| 6,609,808 B2 | * | 8/2003 | Chen .......................... 362/633 |
| 6,634,761 B2 | * | 10/2003 | Ichikawa .................... 362/633 |
| 7,154,570 B2 | * | 12/2006 | Lee ............................... 349/58 |
| 7,248,307 B2 | * | 7/2007 | Han .............................. 349/58 |
| 7,270,467 B2 | * | 9/2007 | Kim .......................... 362/634 |
| 7,481,569 B2 | * | 1/2009 | Chang ........................ 362/633 |
| 7,517,135 B2 | * | 4/2009 | Yu ............................. 362/633 |
| 7,626,747 B2 | * | 12/2009 | Murakata .................... 359/245 |
| 2002/0001184 A1 | * | 1/2002 | Kim et al. .................. 362/633 |
| 2002/0093811 A1 | * | 7/2002 | Chen .......................... 362/633 |
| 2003/0048629 A1 | * | 3/2003 | Kim et al. .................. 362/633 |
| 2003/0223249 A1 | * | 12/2003 | Lee et al. .................... 362/561 |

(Continued)

*Primary Examiner*—Ismael Negron
(74) *Attorney, Agent, or Firm*—Frank R. Niranjan

(57) ABSTRACT

A backlight module includes a frame, a plurality of lamps in the frame, and an optical plate including a main body having a light input surface, and a light output surface opposite to the light input surface. The light input surface is adjacent to the lamps, and at least one bracket extension is integral with one end of the main body for fixing the optical plate to the frame. The at least one bracket extension includes a top surface for supporting a liquid crystal display panel, a side surface connecting with the top surface and being farthest from the main body, and a protecting protrusion located on the side surface for protecting a drive circuit connected to the liquid crystal display panel.

11 Claims, 8 Drawing Sheets

U.S. PATENT DOCUMENTS

| | | | |
|---|---|---|---|
| 2003/0231499 A1* | 12/2003 | Kao | 362/362 |
| 2005/0254261 A1* | 11/2005 | Lo et al. | 362/633 |
| 2007/0047265 A1* | 3/2007 | Kang et al. | 362/634 |
| 2007/0127270 A1* | 6/2007 | Chang | 362/633 |
| 2008/0111949 A1* | 5/2008 | Shibata et al. | 349/64 |
| 2008/0170416 A1* | 7/2008 | Yuan et al. | 362/633 |
| 2008/0291356 A1* | 11/2008 | Kim | 362/633 |
| 2009/0128730 A1* | 5/2009 | Hsu et al. | 362/633 |

* cited by examiner

OPTICAL PLATE WITH OPTICAL SHEET FIXING MEANS AND BACKLIGHT MODULE USING THE SAME

BACKGROUND

1. Field of the Invention

The present invention relates to optical plates, and particularly, to an optical plate used in a backlight module of a liquid crystal display device.

2. Discussion of the Related Art

In a liquid crystal display device (LCD device), liquid crystal is a substance that does not itself illuminate light. Instead, the liquid crystal relies on light received from a light source to display information. In the case of a typical liquid crystal display device, a backlight module powered by electricity supplies the needed light.

FIG. 8 depicts a backlight module 100. The backlight module 100 includes a frame 11, a reflective plate 12, a plurality of lamps 13, a light diffusion plate 14, a prism sheet 15, and an upper light diffusion film 16. The frame 11 includes a bottom frame 112, and an upper frame 116. The bottom frame 112 defines a receiving chamber 114. The lamps 13 are aligned above the reflective plate 12 in the receiving chamber 114. The reflective plate 12 is positioned on a base of the bottom frame 112. The light diffusion plate 14, the prism sheet 15, and the upper light diffusion film 16 are positioned on the bottom frame 112 over the receiving chamber 114 in that order. The upper frame 116 serves as a binder for fixing or holding the light diffusion plate 14, the prism sheet 15, and the upper light diffusion film 16 tightly to the bottom frame 112.

In assembling, firstly, the reflective plate 12 is positioned on the base of the bottom frame 112. Secondly, the lamps 13 are regularly disposed in the receiving chamber 114 of the bottom frame 112. Thirdly, optical elements, such as the light diffusion plate 14, the prism sheet 15 and the upper light diffusion film 16, are respectively positioned on the bottom frame 112 over the receiving chamber 114, in that order. Finally, the upper frame 116 is positioned on the upper light diffusion film 16 and fixed to the bottom frame 112. However, the process of fixing the optical elements respectively on the bottom frame 112 requires high precision and costs time. In addition, this process may easily damage or scratch the optical elements. Thus, the backlight module 100 is unduly complicated in assembling and therefore costly to manufacture.

What is needed, therefore, is a new optical plate and a backlight module using the optical plate that can overcome the above-mentioned shortcomings.

SUMMARY

In one aspect, an optical plate is used in a backlight module having a frame. The optical plate includes a main body and one bracket extension. The main body has a light input surface, and a light output surface opposite to the light input surface. The bracket extension extends from one end of the main body for fixing the optical plate to the frame.

In another aspect, a backlight module includes a frame, a plurality of lamps in the frame, and an optical plate. The optical plate includes a main body, and one bracket extension. The main body has a light input surface, and a light output surface opposite to the light input surface. The light input surface is adjacent to the lamps. The bracket extension extends from one end of the main body for fixing the optical plate to the frame thereat.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present optical plate and backlight module using the optical plate, in detail.

Figure 1:
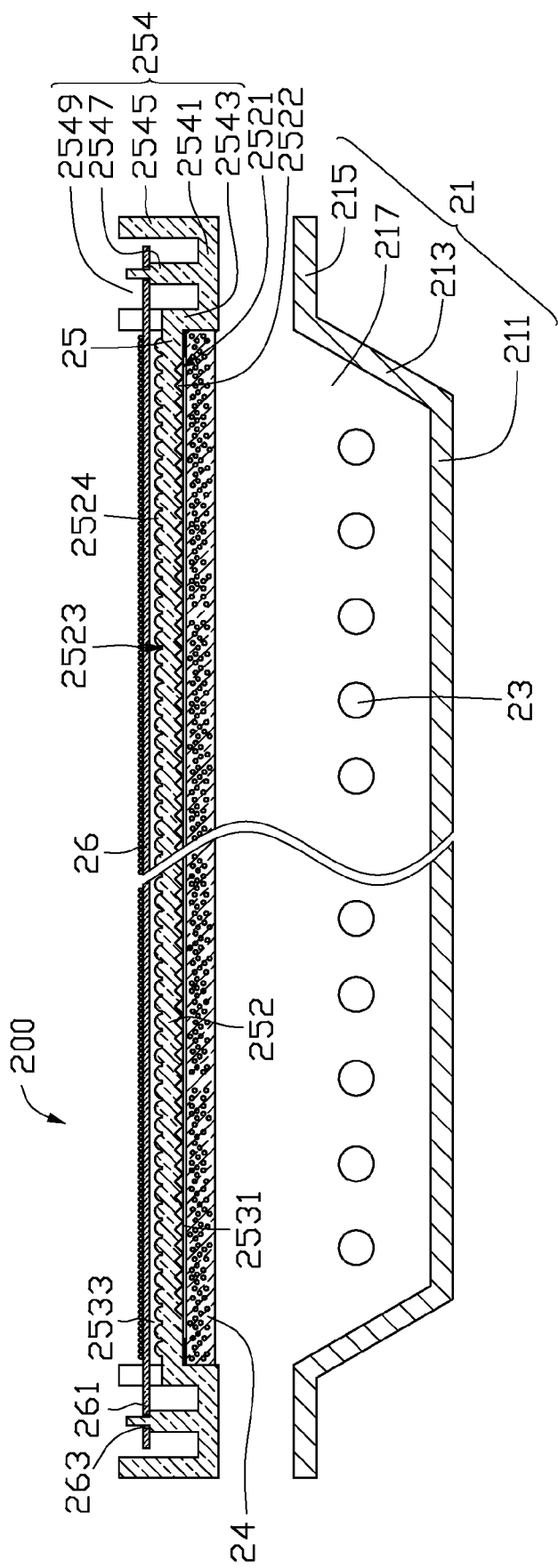
FIG. 1 is a side, cross-sectional view of a backlight module according to a first preferred embodiment of the present invention.

Referring to FIG. 1 a backlight module 200 in accordance with a first preferred embodiment of the present invention is shown. The backlight module 200 includes a frame 21, a plurality of lamps 23, a light diffusion plate 24, an optical plate 25, and an optical film 26.

The frame 21 includes a base 211, a plurality of sidewalls 213, and two supporting portions 215. The sidewalls 213 extend from a periphery of the base 211. The supporting portions 215 extend from edges of the sidewalls 213 on opposite sides of the base 211 correspondingly. The base 211 and the sidewalls 213 cooperatively define a receiving chamber 217. The frame 21 is made of metal or plastic materials with a high reflectivity rate. Preferably, a high reflectivity coating is deposited on the interior of the frame 21 for improving the light reflectivity rate of the frame 21. The lamps 23 are disposed in the receiving chamber 217 in a regular manner. The light diffusion plate 24, the optical plate 25, and the optical film 26 are respectively positioned on the supporting portion 215 over the receiving chamber 217.

The lamps 23 can be point light sources such as light emitting diodes, or linear light sources such as cold cathode fluorescent lamps.

The light diffusion plate 24 is used to diffuse light. The light diffusion plate 24 is made of transparent resin with a plurality of light diffusion particles uniformly dispersed in the transparent resin.

Figure 2:
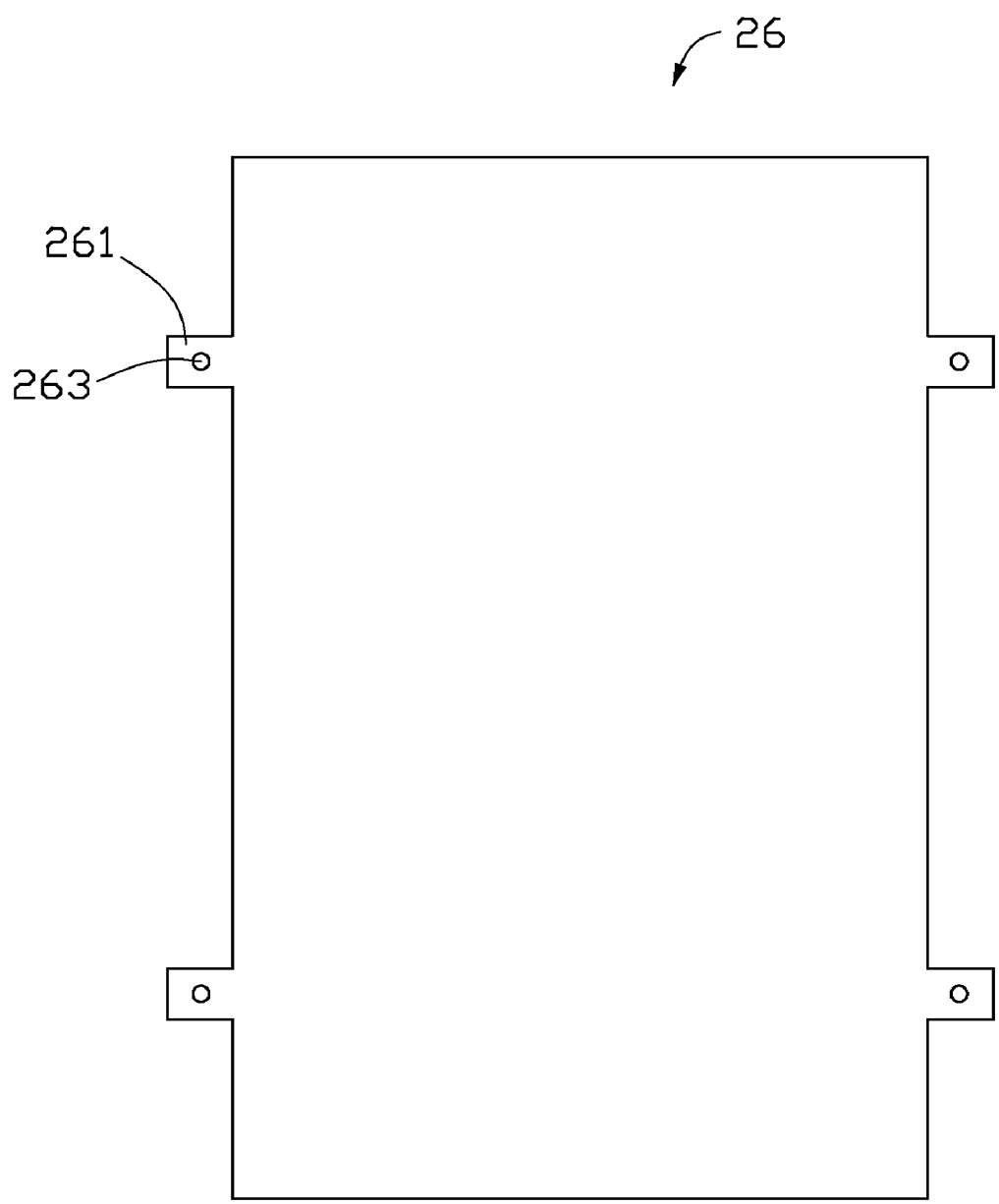
FIG. 2 is a top plan view of an optical film of the backlight module of FIG. 1.

The optical film 26 can be a light diffusion sheet or a light polarizing sheet. Referring to FIG. 2, in the preferred embodiment, the optical film 26 includes four tab portions 261 with each side having two tab portions 261. Each tab portion 261 defines a through hole 263 therein.

Figure 3:
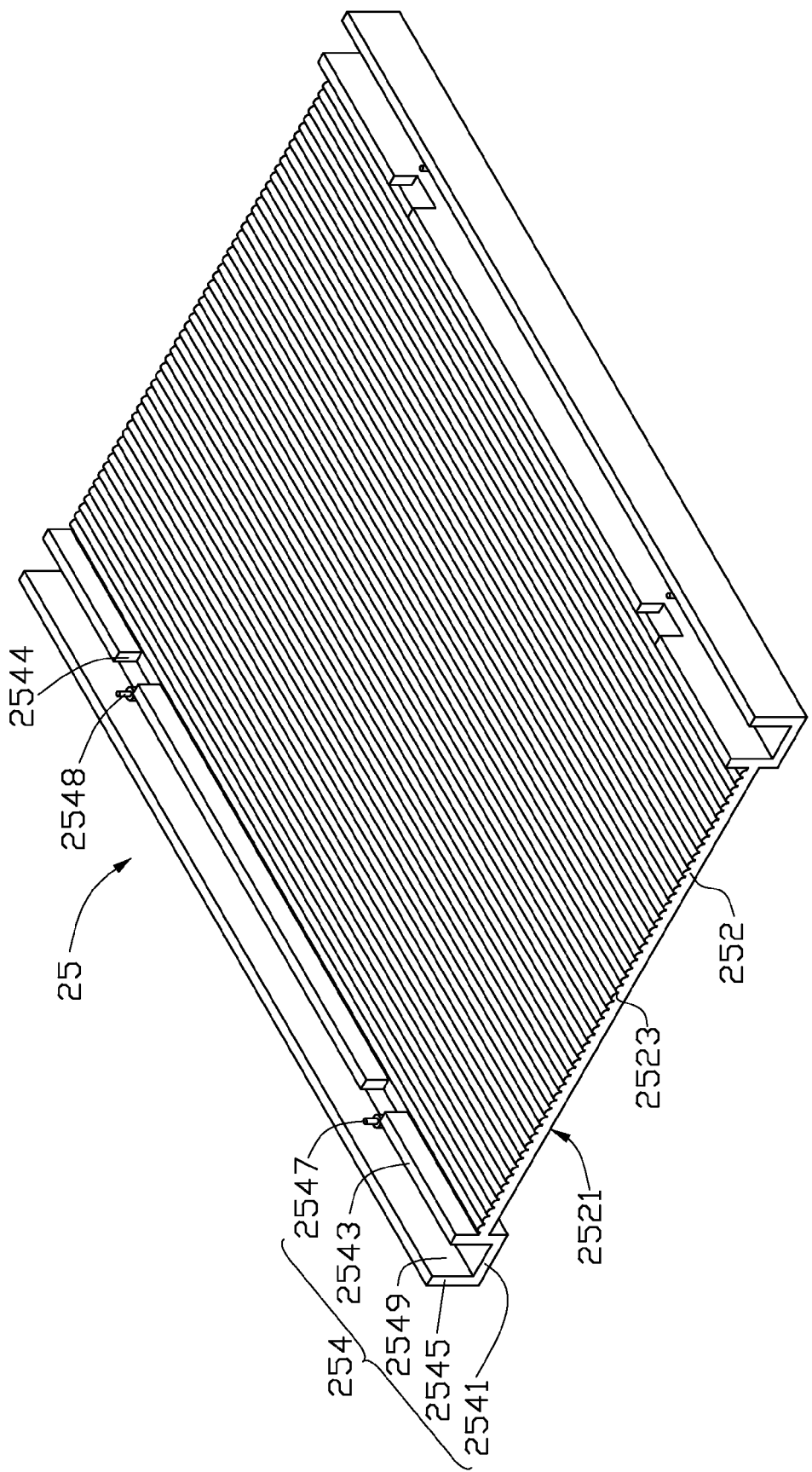
FIG. 3 is an isometric view of an optical plate of the backlight module of FIG. 1.

Referring to FIGS. 1 and 3 again, the optical plate 25 includes a main body 252, and two bracket extensions 254. The bracket extensions 254 extend from edges of the main body 252 on opposite sides of the optical plate 25 correspondingly. The main body 252 has a light input surface 2521, and a light output surface 2523. The light input surface 2521 faces the light diffusion plate 24. The light output surface 2523 faces the optical film 26. In addition, the main body 252 has a plurality of tapered depressions 2522 defined on the light input surface 2521, and a plurality of elongated cylindrical protrusions 2524 formed on the light output surface 2523.

Each of the bracket extensions 254 includes a base 2541, an inner sidewall 2543, an outer sidewall 2545, and two fixing columns 2547. Each inner sidewall 2543 connects with the main body 252. Each inner sidewall 2543 defines two cutouts 2544 for engaging with the two tab portions 261 on a corresponding side of the optical film 26. The inner sidewalls 2543 of the bracket extensions 254 and the light input surface 2521 cooperatively define a first receiving chamber 2531. The inner sidewalls 2543 of the bracket extensions 254 and the light output surface 2523 cooperatively define a second receiving chamber 2533. In each bracket extensions 254, the base 2541 connects the inner sidewall 2543 and the outer sidewall 2545. The base 2541, the inner sidewall 2543, and outer sidewall 2545 of each bracket extensions 254 cooperatively define a cavity 2549. The fixing columns 2547 are located on the base 2541 in the cavity 2549 adjacent to the cutouts 2544 correspondingly. In addition, each fixing column 2547 has a pin 2548 at a top of the fixing column 2547 for positioning the optical film 26.

The light diffusion plate 24 is located in the first receiving chamber 2531. The light diffusion plate 24 can be fixed to the optical plate 25 by fusion, such as heat fusion or ultrasonic fusion. In alternative embodiments, the light diffusion plate 24 can be fixed to the optical plate 25 by conglutinating or other fastening means. A main portion of the optical film 26 is located in the second receiving chamber 2533. The tab portions 261 of the optical film 26 extend through the corresponding cutouts 2544. The pins 2548, of the fixing columns 2547 of the optical plate 25, engage in the corresponding through holes 263 defined in the tab portions 261 of the optical film 26. The bases 2541 of the bracket extensions 254 of the optical plate 25 are fixed to the corresponding supporting portions 215 by an adhesive (not shown).

In assembling, the light diffusion plate 24 and the optical film 26 are pre-assembled with the optical plate 25, and then this assemblage is fixed to the frame 21. Therefore, an upper frame of the conventional backlight module can be omitted. Thus a process for assembling the backlight module 200 is improved, and cost of the backlight module 200 is decreased. In addition, because the light diffusion plate 24 and the optical film 26 are fixed to the optical plate 25 in advance, the light diffusion plate 24 and the optical film 26 are not easily damaged or scratched.

Figure 4:
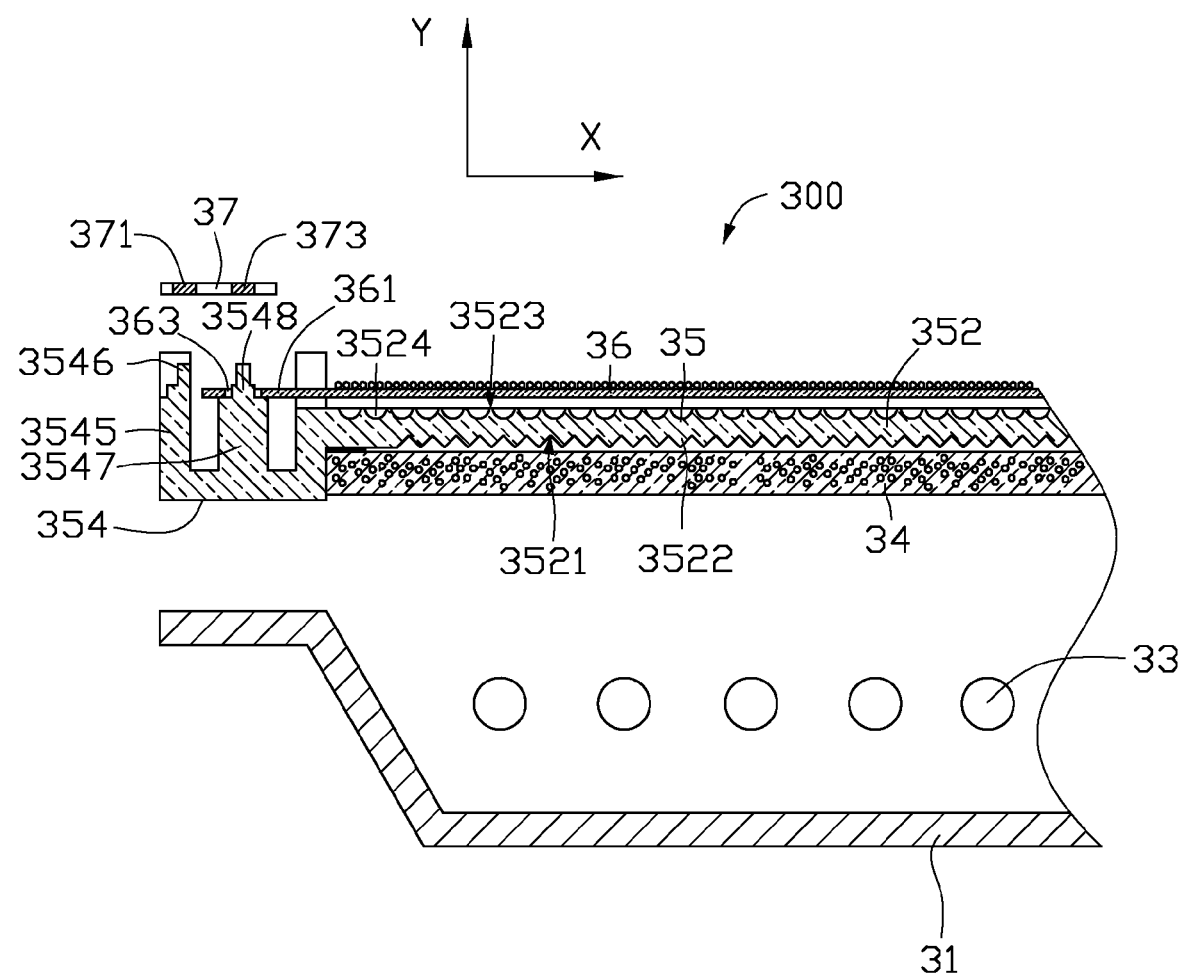
FIG. 4 is a side, partial, cross-sectional view of a backlight module according to a second preferred embodiment of the present invention.

Referring to FIG. 4, a backlight module 300 in accordance with a second preferred embodiment of the present invention is shown. The backlight module 300 is similar in principle to the backlight module 200 of the first embodiment. The backlight module 300 includes a frame 31, a plurality of lamps 33, a light diffusion plate 34, an optical plate 35, an optical film 36, and a fixing sheet 37. However, the optical plate 35 has a main body 352 and a single bracket extension 354. The main body 352 has a light input surface 3521, and a light output surface 3523. The main body 352 includes a plurality of tapered protrusions 3522 formed on the light input surface 3521, and a plurality of spherical depressions 3524 defined in the light output surface 3523. An outer sidewall 3545 of the bracket extension 354 has a positioning pin 3546. A tab portion 361 of the optical film 36 defines a through hole 363 therein. The bracket extension 354 has a column 3547 with a stepped pin 3548 on a top of the column 3547. A diameter of through hole 363 is larger than a maximum diameter of the stepped pin 3548. The fixing sheet 37 defines two positioning holes 371, 373 therein. In assembling, the stepped pin 3548 runs through the through hole 363 of the optical film 36, and engages in the positioning hole 373 of the fixing sheet 37. Meanwhile, the positioning pin 3546 engages in the positioning hole 371 of the fixing sheet 37. Because the diameter of through hole 363 is larger than the maximum diameter of the stepped pin 3548, the optical film 36 can extend along an X-direction (see X-Y coordinates in FIG. 4). Therefore, the optical film 36 is not deformed.

Figure 5:
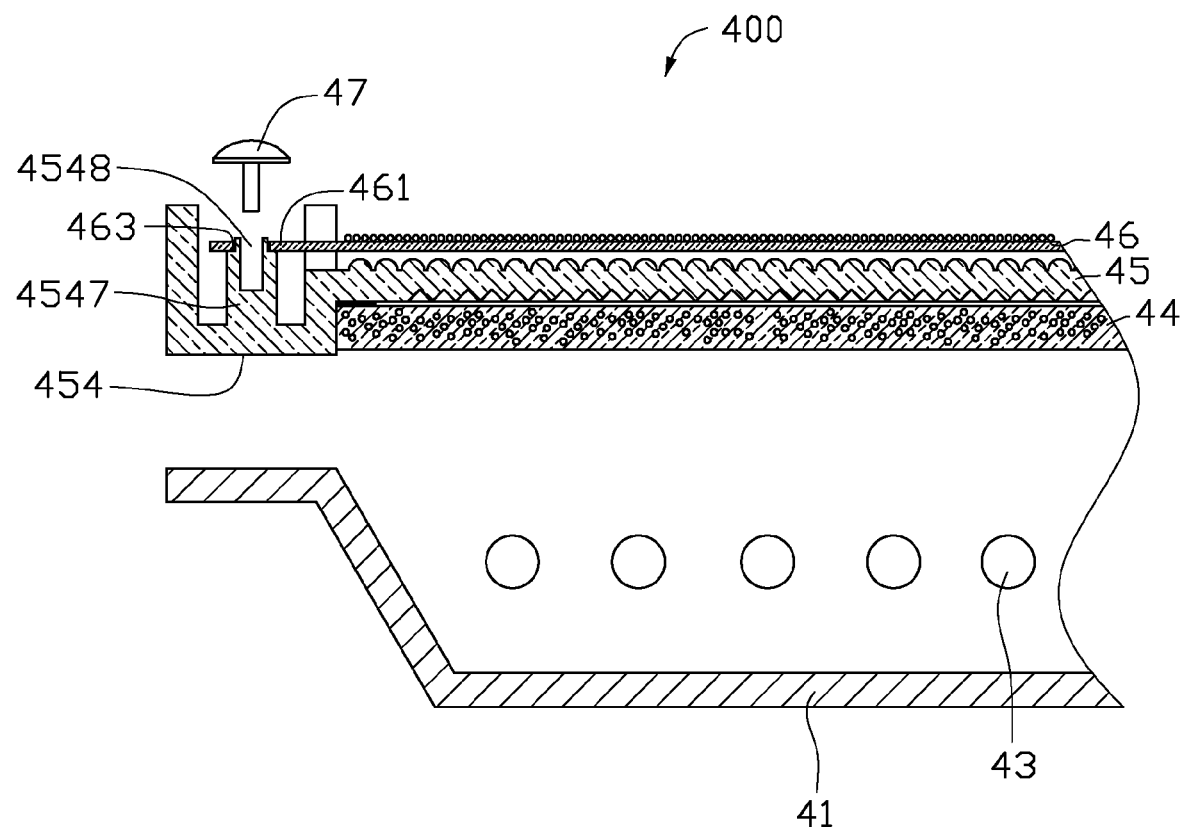
FIG. 5 is a side, partial, cross-sectional view of a backlight module according to a third preferred embodiment of the present invention.

Referring to FIG. 5, a backlight module 400 in accordance with a third preferred embodiment of the present invention is shown. The backlight module 400 includes a frame 41, a plurality of lamps 43, a light diffusion plate 44, an optical plate 45, an optical film 46, and a screw 47. The backlight module 400 is similar in principle to the backlight module 200 of the first embodiment. However, a column 4547 of the bracket extension 454 defines a threaded hole 4548 in an upper surface thereof. A tab portion 461 of the optical film 46 defines a through hole 463 therein. In assembling, the column 4547 is inserted through the through hole 463 of the optical film 46, and then the screw 47 is screwed into the threaded hole 4548, thereby the optical film 46 fixed to the optical plate 45.

Figure 6:
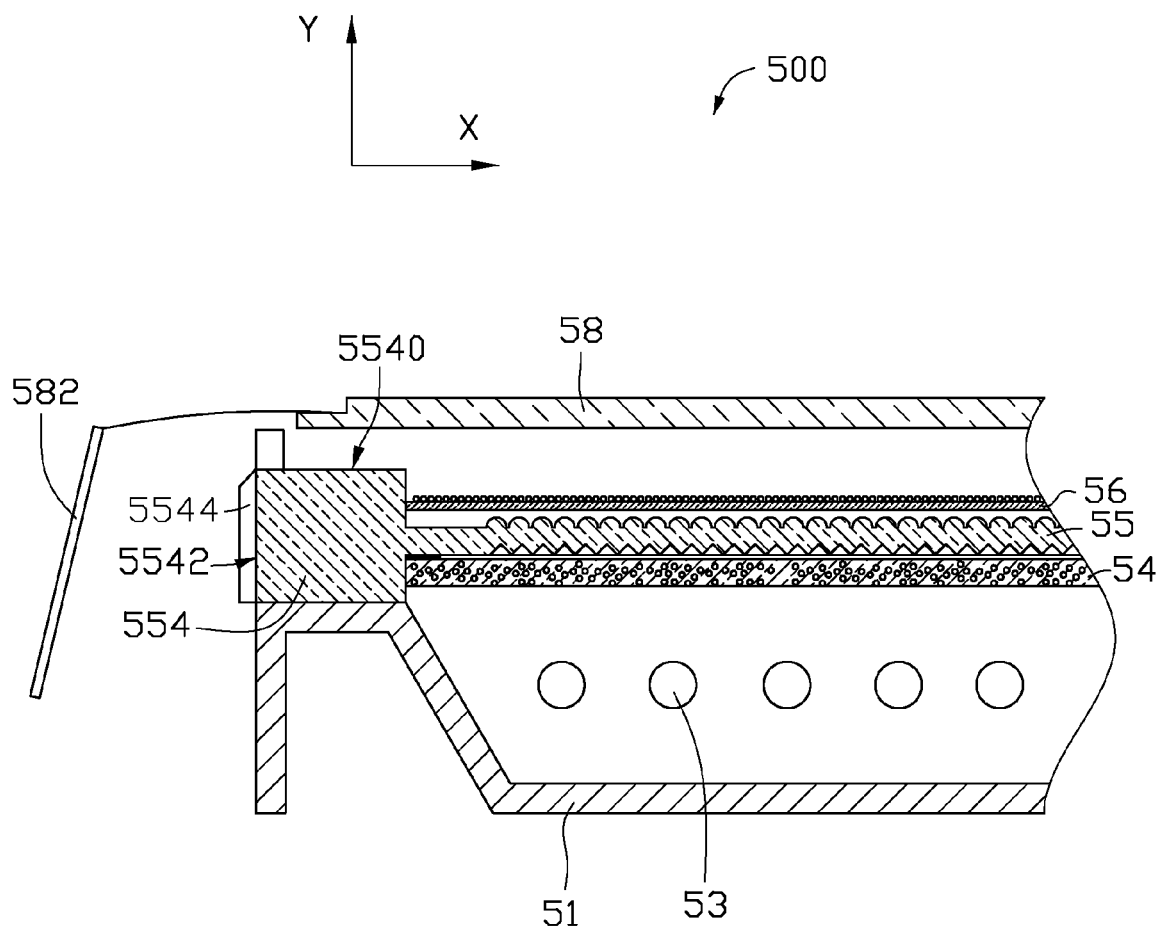
FIG. 6 is a side, partial, cross-sectional view of a backlight module according to a fourth preferred embodiment of the present invention.

Referring to FIG. 6, a backlight module 500 in accordance with a fourth preferred embodiment of the present invention is shown. The backlight module 500 is similar in principle to the backlight module 400 of the third embodiment. The backlight module 500 includes a frame 51, a plurality of lamps 53, a light diffusion plate 54, an optical plate 55, and an optical film 56. However, a bracket extension 554 of the optical plate 55 is solid. The bracket extension 554 includes a top surface 5540, a side surface 5542, and a protecting protrusion 5544. The side surface 5542 connects with the top surface 5540. When the backlight module 500 is used in a liquid crystal display device, the top surface 5540 may support a liquid crystal display panel 58 of the liquid crystal display device, and the protecting protrusion 5544 may protect a drive circuit 582 connected to the liquid crystal display panel 58.

Figure 7:
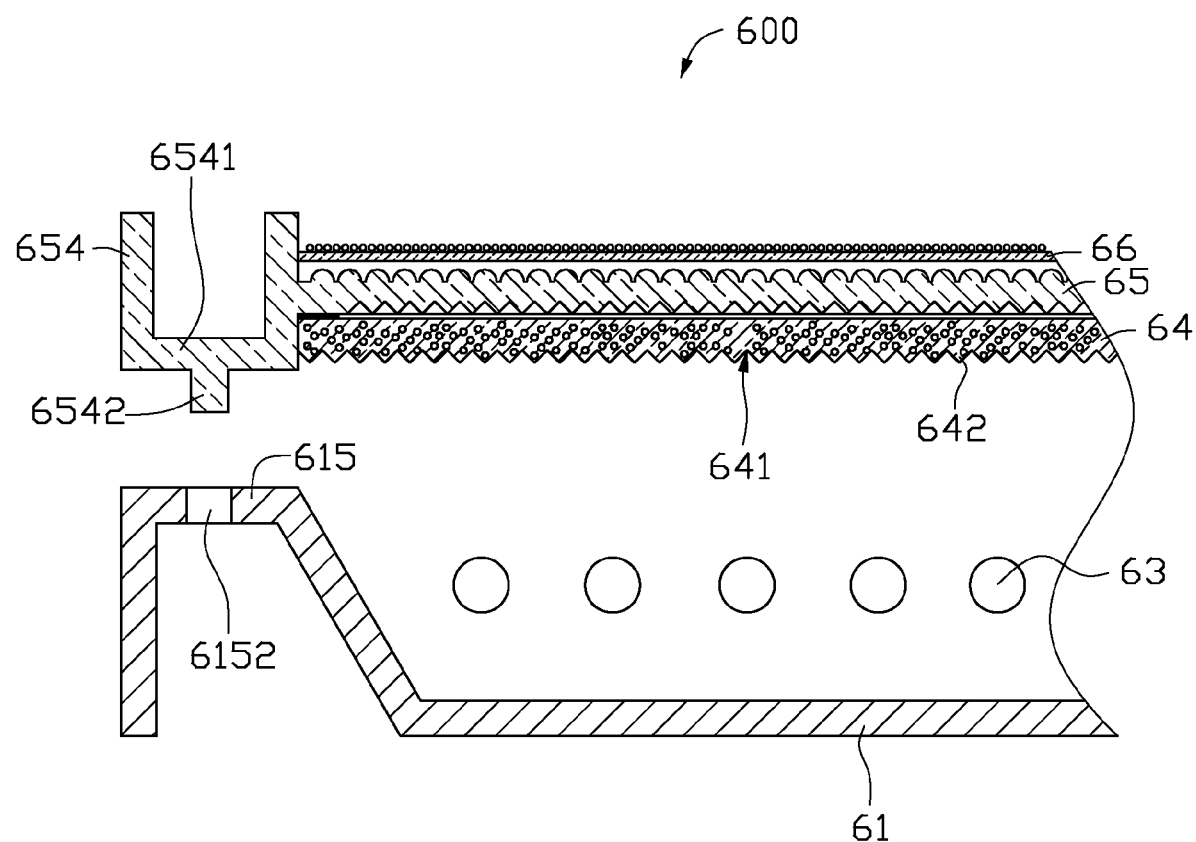
FIG. 7 is a side, partial, cross-sectional view of a backlight module according to a fifth preferred embodiment of the present invention.
Figure 8:
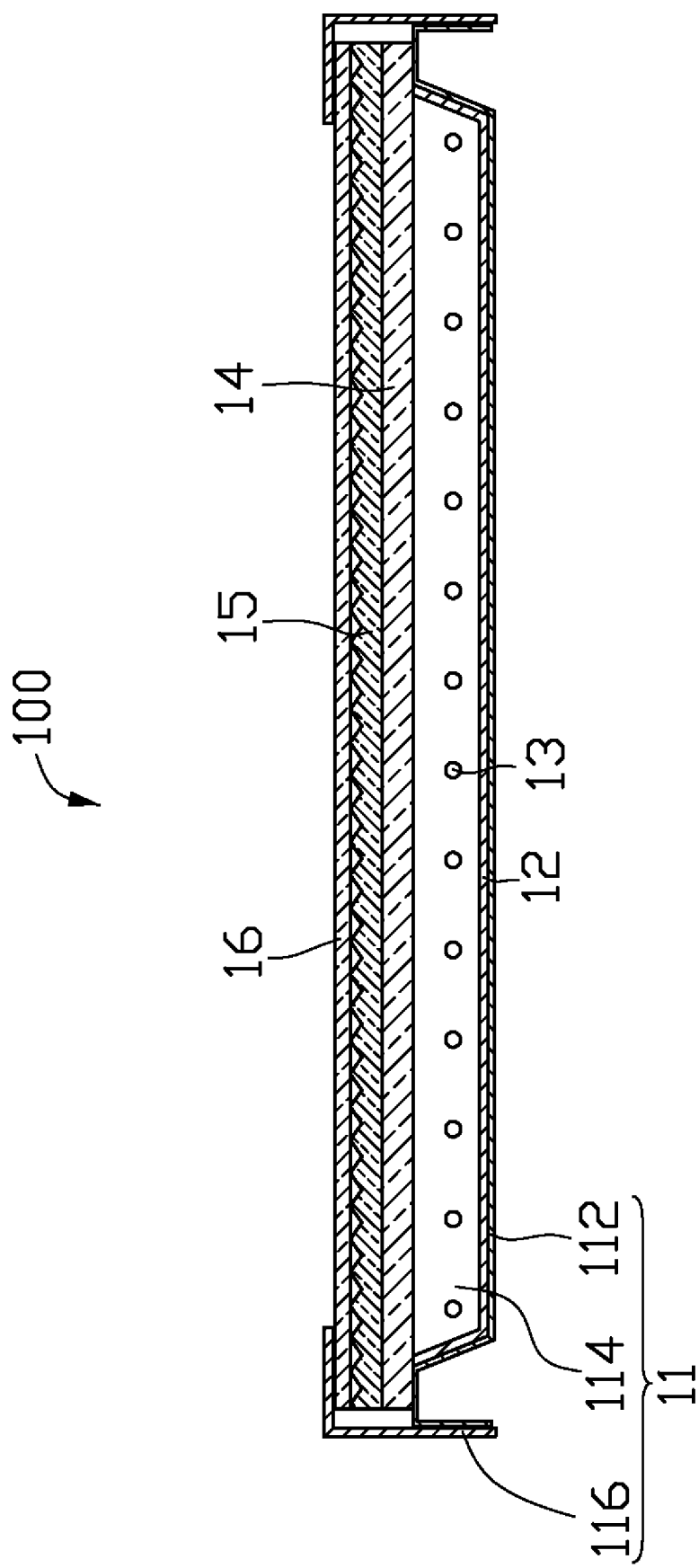
FIG. 8 is a side, cross-sectional view of a conventional backlight module.

Referring to FIG. 7, a backlight module 600 in accordance with a fifth preferred embodiment of the present invention is shown. The backlight module 500 is similar in principle to the backlight module 400 of the third embodiment. The backlight module 600 includes a frame 61, a plurality of lamps 63, a light diffusion plate 64, an optical plate 65, and an optical film 66. However, the light diffusion plate 64 includes a plurality of V-shaped protrusions 642 on a light input surface 641 of the light diffusion plate 64. A base 6541 of a bracket extension 654 of the optical plate 65 has a positioning pin 6542. A supporting portion 615 of the frame 61 defines a positioning through hole 6152 therethrough. In assembling, the positioning pin 6542 engages in the positioning through hole 6152, thereby the optical plate 65 is fixed to the frame 61. In alternative embodiments, the optical plate 65 is fixed to the frame 61 by an adhesive, a screw, or a fastener.

It is noted that the scope of the present optical plate and backlight module is not limited to the embodiments described above. For example, in the backlight module 200, the light diffusion plate 24, the optical plate 25 and the optical film 26 can be integrally formed. The tapered depressions 2522 or elongated cylindrical protrusions 2524 can be replaced by elongated cylindrical depressions, elongated V-shaped depressions, or elongated V-shaped protrusions.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A backlight module comprising:
a frame,
a plurality of lamps in the frame, and
an optical plate comprising:
a main body having a light input surface, and a light output surface opposite to the light input surface, the light input surface adjacent to the lamps, and
at least one bracket extension integral with one end of the main body for fixing the optical plate to the frame thereat, wherein the at least one bracket extension comprises a top surface for supporting a liquid crystal display panel, a side surface connecting with the top surface and being farthest from the main body, and a protecting protrusion located on the side surface for protecting a drive circuit connected to the liquid crystal display panel.

2. The backlight module according to claim 1, wherein the at least one bracket extension is solid.

3. The backlight module according to claim 1, wherein the at least one bracket extension is fixed to the frame by one of an adhesive, a screw, a pin, and a fastener.

4. The backlight module according to claim 1, wherein at least one of the light input surface and the light output surface comprises spherical depressions, spherical protrusions, tapered depressions, tapered protrusions, elongated depressions, or elongated protrusions.

5. The backlight module according to claim 1, wherein the at least one bracket extension comprises an inner sidewall connecting with the end of the main body, the inner sidewall and the light input surface defining a first receiving chamber, and the backlight module further comprises a light diffusion plate located in the first receiving chamber.

6. The backlight module according to claim 5, wherein the light diffusion plate is fixed to the optical plate by one of fusion, conglutinating and fastening.

7. The backlight module according to claim 5, wherein the inner sidewall and the light output surface define a second receiving chamber, and the backlight module further comprises an optical film located in the second receiving chamber.

8. The backlight module according to claim 7, wherein the optical film comprises a tab portion extending from an end of the optical film, the tab portion defining a hole therein, and the bracket extension comprises a column beside the inner sidewall, the column engaging in the hole.

9. The backlight module according to claim 8, wherein the column has a fixing hole therein, and the optical film is fixed with the optical plate by a pin engaging in the fixing hole.

10. The backlight module according to claim 8, wherein the at least one bracket extension comprises a base and an outer sidewall, the base connecting the inner sidewall and the outer sidewall, the column located on the base.

11. The backlight module according to claim 8, wherein the backlight module further comprises a fixing sheet, the fixing sheet matching with the column on the optical film.

* * * * *